(12) United States Patent
Basham et al.

(10) Patent No.: US 7,119,140 B2
(45) Date of Patent: Oct. 10, 2006

(54) TRANSPARENT FILMS, COMPOSITIONS, AND METHOD OF MANUFACTURE THEREOF

(76) Inventors: Ronald Basham, 7727 Chapel Hill Dr., Evansville, IN (US) 47712; Gheorghe Cojocariu, 5041 Lakeside Ct., Evansville, IN (US) 47712; Robert R. Gallucci, 1109 Tanglewood Dr., Mt. Vernon, IN (US) 47620; Anshu S. Ghosal, M22 Saket, First Floor, New Delhi, 110017 (IN); Emine Elif Gurel, 318 Charity Cir., Evansville, IN (US) 47712; Grant Hay, 5629 Cooper Canyon, Evansville, IN (US) 47712

( * ) Notice: Subject to any disclaimer, the term of this patent is extended or adjusted under 35 U.S.C. 154(b) by 0 days.

(21) Appl. No.: 10/898,084

(22) Filed: Jul. 22, 2004

(65) Prior Publication Data

US 2006/0020075 A1    Jan. 26, 2006

(51) Int. Cl.
*B60C 1/00*       (2006.01)
*C08K 3/40*       (2006.01)

(52) U.S. Cl. .................................... 524/494
(58) Field of Classification Search ............... 524/494
See application file for complete search history.

(56) References Cited

U.S. PATENT DOCUMENTS

| | | | |
|---|---|---|---|
| 3,635,895 A | 1/1972 | Kramer | |
| 4,001,184 A | 1/1977 | Scott | |
| 4,217,438 A | 8/1980 | Brunelle et al. | |
| 4,238,597 A | 12/1980 | Markezich et al. | |
| 4,358,556 A * | 11/1982 | van Abeelen ............... 524/267 | |
| 4,487,896 A | 12/1984 | Mark et al. | |
| 4,569,970 A | 2/1986 | Paul et al. | |
| 4,600,632 A | 7/1986 | Paul et al. | |
| 4,746,701 A | 5/1988 | Kress et al. | |
| 4,788,252 A | 11/1988 | de Boer et al. | |
| 4,983,658 A | 1/1991 | Kress et al. | |
| 5,023,297 A | 6/1991 | Boutni | |
| 5,109,076 A | 4/1992 | Freitag et al. | |
| 5,322,882 A | 6/1994 | Okamoto | |
| 5,360,861 A | 11/1994 | Campbell | |
| 5,380,795 A | 1/1995 | Gosens et al. | |
| 5,391,603 A | 2/1995 | Wessel et al. | |
| 5,451,632 A | 9/1995 | Okumura et al. | |
| 5,488,086 A | 1/1996 | Umeda et al. | |
| 5,510,414 A | 4/1996 | Okamoto et al. | |
| 5,530,083 A | 6/1996 | Phelps | |
| 5,556,673 A | 9/1996 | Giraud | |
| 5,602,201 A | 2/1997 | Fujiguchi et al. | |
| 5,608,026 A | 3/1997 | Hoover et al. | |
| 5,616,674 A | 4/1997 | Michel et al. | |
| 5,783,624 A * | 7/1998 | Khanarian et al. .......... 524/494 | |
| 5,859,119 A | 1/1999 | Hoefflin | |
| 6,001,929 A | 12/1999 | Nodera et al. | |
| 6,072,011 A | 6/2000 | Hoover | |
| 6,103,810 A | 8/2000 | Frayer et al. | |
| 6,246,123 B1 * | 6/2001 | Landers et al. ............. 257/787 | |
| 6,458,913 B1 | 10/2002 | Honigfort et al. | |
| 6,465,102 B1 | 10/2002 | Honigfort et al. | |
| 6,559,270 B1 | 5/2003 | Siclovan et al. | |
| 6,630,420 B1 | 10/2003 | Naumann et al. | |
| 6,657,018 B1 | 12/2003 | Hoover ....................... 525/464 | |
| 2002/0111428 A1 | 8/2002 | Gaggar et al. | |
| 2003/0032725 A1 | 2/2003 | Gaggar et al. | |
| 2003/0092837 A1 | 5/2003 | Eichenauer | |
| 2003/0105226 A1 | 6/2003 | Cella et al. | |
| 2003/0119986 A1 | 6/2003 | Eichenauer | |
| 2004/0044105 A1 | 3/2004 | Webster | |
| 2004/0066645 A1 * | 4/2004 | Graf et al. .................... 362/31 | |
| 2004/0220330 A1 | 11/2004 | DeRudder et al. | |
| 2005/0170180 A1 * | 8/2005 | Kawa ........................ 428/402 | |

FOREIGN PATENT DOCUMENTS

| | | |
|---|---|---|
| DE | 40 16 417 A1 | 11/1991 |
| EP | 0 138 528 | 10/1984 |
| EP | 0 248 308 A2 | 12/1987 |
| EP | 0 254 054 B1 | 1/1988 |
| EP | 0 376 052 B1 | 7/1990 |
| EP | 0 387 570 B1 | 9/1990 |
| EP | 0 434 848 B1 | 7/1991 |
| EP | 0 500 325 | 2/1992 |
| EP | 0 524 731 B1 | 6/1992 |
| EP | 0 517 927 B1 | 12/1992 |
| EP | 0 522 753 A2 | 1/1993 |
| EP | 0 567 655 B1 | 11/1993 |
| EP | 0 628 600 B1 | 12/1994 |
| EP | 0 645 422 A1 | 3/1995 |
| EP | 1 553 138 | 9/2002 |
| EP | 1 561 732 | 10/2003 |
| WO | WO 02/38675 A2 | 5/2002 |
| WO | WO 2004/035497 | 4/2004 |

OTHER PUBLICATIONS

JP 04-225062 Aug. 14, 1992 (translation of abstract only).
JP 04-249537 Sep. 4, 1992 (translation of abstract only).

(Continued)

Primary Examiner—Nathan M. Nutter

(57) ABSTRACT

A film comprising in admixture a thermoplastic resin component comprising a thermoplastic resin component and a glass having a refractive index within 0.04 of the thermoplastic resin component, wherein the film has a haze of less than about 20%, total transmittance of greater than about 70%, and a coefficient of thermal expansion of about 20 to about 80 um/m/° C. measured over a temperature range of 20 to 70° C. The films are of particular utility in optical applications such as light diffuser films.

20 Claims, 2 Drawing Sheets

OTHER PUBLICATIONS

JP 05-156170 Jun. 22, 1993 (translation of abstract only).
JP 05-255583 Oct. 5, 1993 (translation of abstract only).
JP 05-311075 Nov. 22, 1993 (translation of abstract only).
JP 06-184424 Jul. 5, 1994 (translation of abstract only).
JP 06-212070 Aug. 2, 1994 (translation of abstract only).
JP 06-228424 Aug. 16, 1994 (translation of abstract only).
JP 09-040856 Feb. 10, 1997 (translation of abstract only).
Nakao, T., et al. "High Performance Plastic Substrate for Flat Panel Displays" The 10th International Display Workshop, Fukuoka, Japan (Dec. 3-5, 2003) 621-624.
Okamoto, Masaya "Relationship between the Composition of Polycarbonate Copolymers and the Refractive Index", Journal of Applied Polymer Science, vol. 84, 514-521 (2002).
DE 40 16 417A1; Nov. 28, 1991 (translation of abstract only).
EP 0 248 308; Dec. 9, 1987 (translation of abstract only).
EP 0 387 570; Sep. 19, 1990 (translation of abstract only).
JP05294671. Publication Date Nov. 9, 1993. Glass Fiber for Reinforcing Polycarbonate Resin. (Abstract Only).
JP04008761. Publication Date Jan. 13, 1992. Polycarbonate Resin Composition. (Abstract Only).
JP58060641. Publication Date Apr. 11, 1983. Glass Fiber Composition (Abstract Only).
JP05155638. Publication Date Jun. 22, 1993. Glass Composition. (Abstract Only).
JP2000063653. Publication Date: Feb. 29, 2000. Polycarbonate Resin Composition Having Transparency and Slidabiliity. (Abstract Only).
International Search Report for International Application No. PCT/US2005/025964. Date Mailed: Oct. 20, 2005.

* cited by examiner

In flow CTE versus glass loading

- 737BC
- Chopped Vantage 3540
- DBC589
- 503-K-275
- T-511
- ARG (GAP-50)

Waves without LCD panel

- Chop Vantage 3540
- 737 BC

Haze in polish/polish glass reinforced films

T% in polish/polish glass reinforced films

TRANSPARENT FILMS, COMPOSITIONS, AND METHOD OF MANUFACTURE THEREOF

BACKGROUND OF INVENTION

The present invention relates to transparent films and compositions, and in particular to transparent films for optical applications.

Polycarbonate (PC) is an engineering thermoplastic resin with excellent toughness and clarity. Due to its excellent performance characteristics, polycarbonate is used in many applications requiring optical quality, including compact disks, ophthalmic lenses, and as diffuser films in backlit display devices. Polycarbonate films offer a number of advantages over poly(ethylene terephthalate) (PET), films including higher heat distortion temperature (HDT), higher scratch resistance, and better performance under stringent environmental conditions.

One of the major performance demands of a diffuser film is dimensional stability. Generally, when polycarbonate films are used in this application, portions of the film near the hot lamp may expand, while film further from the lamp either does not expand or does not expand to a similar extent, resulting in warping or wrinkling in these portions of the film. This can lead to an optical waving effect that is evident by sinusoidal oscillations in luminance intensity across the display panel after exposure. This problem may become progressively worse as the area of the film increases, and as the environmental conditions become more stringent. For larger displays like those in liquid crystalline display television (LCD TV) there is a demand for more and brighter fluorescent lamps, hence exposing the back lit module (BLM) and display to higher temperatures.

There accordingly remains a need in the art for films that that will remain flat over a wide temperature range, i.e., films that are dimensionally stable and therefore non-waving in use. It would be a further advantage of the film maintained a combination of advantageous physical characteristics such as low haze, high percent transmission (% T), low yellowing, and/or improved melt stability. Such compositions can be used in making films that will retain flatness over a wide range of end use conditions.

BRIEF DESCRIPTION OF THE INVENTION

In one embodiment there is provided a flat film comprising in admixture a thermoplastic resin component comprising a polycarbonate; and a glass having a refractive index within 0.04 of the thermoplastic resin component, wherein the film composition has a haze of less than about 20%, total transmittance of greater than about 70%, and a coefficient of thermal expansion of about 20 to about 70 um/m/° C. measured over a temperature range of 20 to 70° C.

In another embodiment there is provided an article comprising the above film.

In another embodiment, a method of making a flat film having improved resistance to waving comprises forming a film from a polycarbonate composition comprising a thermoplastic resin component comprising a polycarbonate; and a glass having a refractive index within 0.04 of the thermoplastic resin component, wherein the film composition has a haze of less than about 20%, total transmittance of greater than about 70%, and a coefficient of thermal expansion of about 20 to about 70 um/m/° C. measured over a temperature range of 20 to 70° C.

In yet another embodiment there is provided a polycarbonate composition comprising in admixture a thermoplastic resin component comprising a polycarbonate; and a glass having a refractive index that is within 0.04 of the thermoplastic resin component, and wherein the polycarbonate composition has a haze of less than about 20%, a total transmittance of greater than about 70%, a coefficient of thermal expansion of about 20 to about 70 um/m/° C. measured over a temperature range of 20° C. to 70° C., and a melt viscosity of about 0.5 to about 30.0 $cm^3/10$ min measured according to ASTM D1238 at 300° C.

In another embodiment there is provided a process of making a polycarbonate composition comprising combining a thermoplastic resin component comprising a polycarbonate with a glass having a refractive index within 0.04 of the thermoplastic resin component, wherein the polycarbonate composition has a haze of less than about 20%, total transmittance of greater than about 70%, a coefficient of thermal expansion of about 20 to about 70 um/m/° C. measured over a temperature range of 20 to 70° C., and a melt viscosity of about 0.5 to about 30.0 $cm^3/10$ min measured according to ASTM D1238 at 300° C.

In yet another embodiment there is provided an article comprising the above polycarbonate composition.

DETAILED DESCRIPTION

Figure 1:
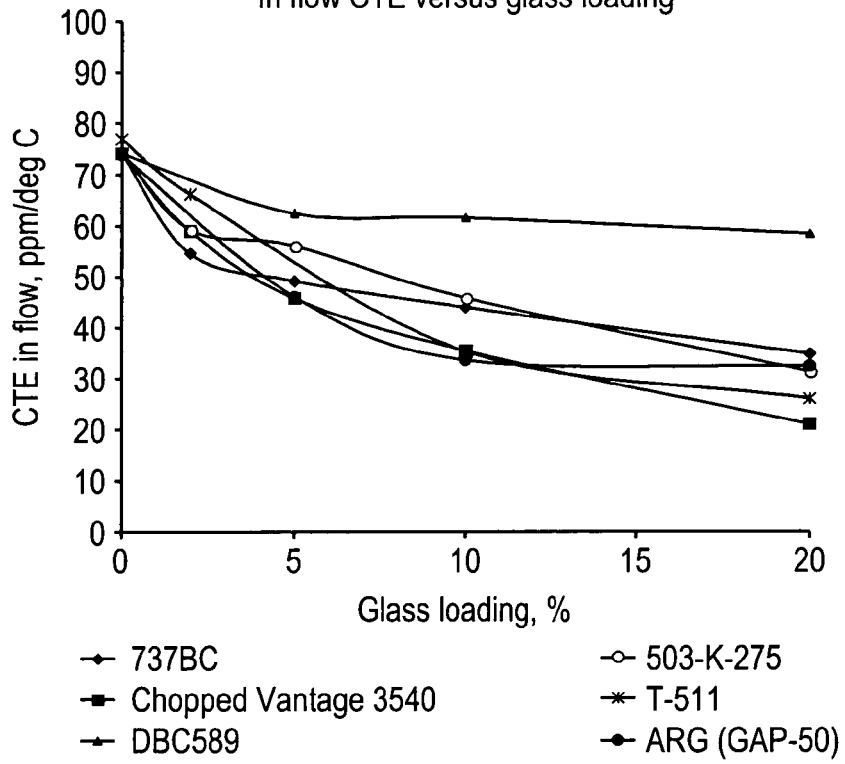
FIG. 1 is a graph of the change in the inflow coefficient of thermal expansion as the amount of glass loading increases.

It has been unexpectedly found by the inventors hereof that compositions having a polycarbonate and a glass that closely matches the refractive index of the polycarbonate can provide films that retain their transparency, yet have lower warping and/or wrinkling over a useful temperature range such as about 0 to about 100° C., about 0° to about 80° C. and in other case from about 20 to about 70° C. In particular, the films may have a low coefficient of thermal expansion ("CTE"); low yellowing; low haze; high transmission, and/or high flexural modulus. Such films, when heated in a constrained geometry, will show better flatness, i.e., less waviness, than a higher CTE film. The matched refractive index matched glasses preserve the optical properties of the polycarbonates, such as high transmittance and low haze.

It has further been found that in some instances the refractive index matching glass adversely affects the melt stability of the polycarbonate, which can result in a loss of properties and/or the formation of voids or bubbles in the film. Passivation of the glasses can prevent degradation of the polycarbonate resin during melt processing to form the film. In particular, improved melt stability may be obtained when the glasses are treated with a silane compound.

The polycarbonate compositions may be used to form films, such as flat films, of optical quality. In a particularly advantageous feature, the films manufactured from these compositions may have significantly reduced thermal distortion (waving) in applications such as backlit displays with little to no degradation of the luminance when compared to polycarbonate without glass.

The terms "polycarbonate" and "polycarbonate resin" means compositions having repeating structural carbonate units of the formula (1):

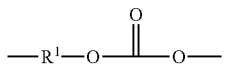
(1)

in which at least 60 percent of the total number of $R^1$ groups are aromatic organic radicals and the balance thereof are aliphatic, alicyclic, or aromatic radicals. In one embodiment, each $R^1$ is an aromatic organic radical and, preferably, a radical of the formula (2):

$$-A^1-Y^1-A^2-\qquad(2)$$

where each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3)

$$HO-A^1-Y^1-A^2-OH\qquad(3)$$

wherein $Y^1$, $A^1$ and $A^2$ are as described above. Also included are bisphenol compounds of general formula (4):

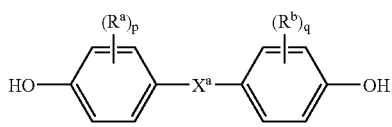
(4)

wherein $R^a$ and $R^b$ each represent a halogen atom or a monovalent hydrocarbon group and may be the same or different; p and q are each independently integers of 0 to 4; and $X^a$ represents one of the groups of formula (5):

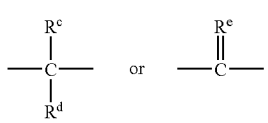
(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted hydrocarbons disclosed by name or formula (generic or specific) in U.S. Pat. No. 4,217,438. A nonexclusive list of specific examples of suitable dihydroxy compounds includes the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenly)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxphenyl)phtalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as mixtures comprising the foregoing dihydroxy compounds.

A nonexclusive list of specific examples of the types of bisphenol compounds that are represented by formula (3) includes 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis (4-hydroxyphenyl)propane, 1,1-bis(4-hydroxyhenyl) n-butane, 2,2-bis(4-hydroxy-1-methylphenyl) propane, and 1,1-bis(4-hydroxy-t-butylphenyl) propane. Combinations comprising the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and combinations comprising at least one the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris ((p-hydroxyphenyl)isopropyl)benzene), tris-phenol PA (4(4 (1,1-bis(p-hydroxyphenyl)ethyl) alpha, alpha-dimethyl benzyl)phenol), 4-chloroformyl phthalic anhydyride, trimesic acid, and benzophenone tetracarboxylic acid. The branching agents are added at a level of 0.05 to 2.0 weight percent (wt. %). Branching agents and procedures for making branched polycarbonates are described in U.S. Pat. Nos. 3,635,895 and 4,001,184, which are incorporated by reference. All types of polycarbonate end groups are contemplated as being useful in the polycarbonate composition.

"Polycarbonates" and "polycarbonate resins" as used herein further includes copolymers or blends of polycarbonates with other copolymers comprising carbonate chain units. A specific suitable copolymer is a polyestercarbonate, also known as a copolyester-polycarbonate. Such copolymers further contain, in addition to recurring carbonate chain units of the formula (1), repeating units of formula (6)

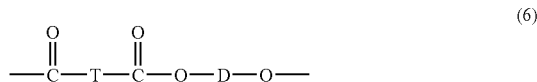

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and is, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. In one embodiment, the halogen is bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluororesorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluorohydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. In one embodiment acids containing fused rings can also be present, such as in 1,4-, 1,5-, or 2,6-naphthalenedicarboxylic acids. The dicarboxylic acids may be, for example, terephthalic acid, isophthalic acid, naphthalene dicarboxylic acid, cyclohexane dicarboxylic acid, or combinations comprising at least one of the foregoing dicarboxylic acids. In another embodiment a dicarboxylic acid comprises a mixture of isophthalic acid and terephthalic acid where the weight ratio of terephthalic acid to isophthalic acid is 10:1 to 0.2:9.8. In another specific embodiment, D is a $C_{2-6}$ alkylene radical and T is p-phenylene, m-phenylene, naphthalene, a divalent cycloaliphatic radical, or a combination comprising at least one of the foregoing. This class of polyester includes the poly(alkylene terephthalates).

Another useful type of polycarbonate is a polysiloxane-polycarbonate copolymer having polydiorganosiloxane blocks comprising repeating structural units of formula (8):

(8)

wherein each occurrence of R is same or different, and is a $C_{1-13}$ monovalent organic radical. For example, R may be a $C_1$–$C_{13}$ alkyl group, $C_1$–$C_{13}$ alkoxy group, $C_2$–$C_{13}$ alkenyl group, $C_2$–$C_{13}$ alkenyloxy group, $C_3$–$C_6$ cycloalkyl group, $C_3$–$C_6$ cycloalkoxy group, $C_6$–$C_{10}$ aryl group, $C_6$–$C_{10}$ aryloxy group, $C_7$–$C_{13}$ aralkyl group, $C_7$–$C_{13}$ aralkoxy group, $C_7$–$C_{13}$ alkaryl group, or $C_7$–$C_{13}$ alkaryloxy group. Combinations of the foregoing R groups may be used in the same copolymer.

D in formula (8) is selected so as to provide an effective level of transparency to the polycarbonate composition. The value of D will therefore vary widely depending on the type and relative amount of each component in the thermoplastic composition, the desired properties of the composition, and like considerations. Generally, D may have an average value of 2 to about 1000, specifically 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polysiloxane-polycarbonate copolymer. Conversely, where D is of a higher value, e.g., greater than about 40, it may be necessary to use a relatively lower amount of the polysiloxane-polycarbonate copolymer. A combination of a first and a second (or more) polysiloxane-polycarbonate copolymers may be used, wherein the average value of D of the first copolymer is less than the average value of D of the second copolymer.

In one embodiment the polydiorganosiloxane blocks comprise repeating structural units of formula (9)

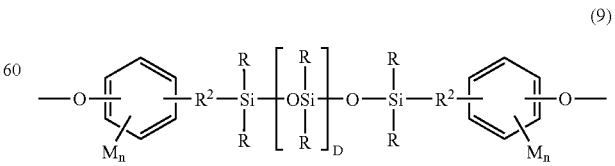

(9)

wherein each occurrence of R is same or different, and is a $C_{1-13}$ monovalent organic radical. For example, R may be a $C_1$–$C_{13}$ alkyl group, $C_1$–$C_{13}$ alkoxy group, $C_2$–$C_{13}$ alkenyl group, $C_2$–$C_{13}$ alkenyloxy group, $C_3$–$C_6$ cycloalkyl group, $C_3$–$C_6$ cycloalkoxy group, $C_6$–$C_{10}$ aryl group, $C_6$–$C_{10}$ aryloxy group, $C_7$–$C_{13}$ aralkyl group, $C_7$–$C_{13}$ aralkoxy group, $C_7$–$C_{13}$ alkaryl group, or $C_7$–$C_{13}$ alkaryloxy group. Combinations of the foregoing R groups may be used in the same copolymer. $R^2$ in formula (9) is a divalent $C_1$–$C_8$ aliphatic group. Each M in formula (9) may be the same or different, and may be a halogen, cyano, nitro, $C_1$–$C_8$ alkylthio, $C_1$–$C_8$ alkyl, $C_1$–$C_8$ alkoxy, $C_2$–$C_8$ alkenyl, $C_2$–$C_8$ alkenyloxy group, $C_3$–$C_8$ cycloalkyl, $C_3$–$C_8$ cycloalkoxy, $C_6$–$C_{10}$ aryl, $C_6$–$C_{10}$ aryloxy, $C_7$–$C_{12}$ aralkyl, $C_7$–$C_{12}$ aralkoxy, $C_7$–$C_{12}$ alkaryl, or $C_7$–$C_{12}$ alkaryloxy, wherein each n is independently 0, 1, 2, 3, or 4.

In one embodiment, M is independently bromo or chloro, a $C_1$–$C_3$ alkyl group such as methyl, ethyl, or propyl, a $C_1$–$C_3$ alkoxy group such as methoxy, ethoxy, or propoxy, or a $C_6$–$C_7$ aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$–$C_3$ aliphatic group, and R is methyl.

Generally, the amount of dihydroxy polydiorganosiloxane is selected so as to produce a copolymer comprising about 0.1 to about 20 mole percent of polydiorganosiloxane blocks relative to the moles of polycarbonate blocks, and more specifically, about 0.5 to about 12 mole percent of polydiorganosiloxane blocks relative to the moles of polycarbonate blocks. The polysiloxane-polycarbonate copolymers are preferably transparent, and can have a weight-average molecular weight (measured, for example, by gel permeation chromatography, ultra-centrifugation, or light scattering) of about 10,000 to about 200,000, specifically about 20,000 to about 100,000. The polysiloxane-polycarbonate copolymers may have a weight-average molecular weight of about 15,000 to about 100,000. Suitable transparent polysiloxane-polycarbonate copolymers are commercially available from GE Plastics.

Some polycarbonates are based on bisphenol A, in which each of $A^1$ and $A^2$ are p-phenylene and $Y^1$ is isopropylidene. In one embodiment, the weight average molecular weight of the polycarbonate is about 10,000 to about 100,000, specifically about 20,000 to about 50,000, more specifically about 25,000 to about 40,000, as determined by gel permeation chromatography in dichloromethane using polystyrene standards. Combinations of polycarbonates of different molecular weights may be used.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, and under controlled pH conditions, for example at a pH of about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the preferred phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, $CH_3[CH_3(CH_2)_2]_3NX$ wherein X is Cl$^-$, Br$^-$, or a $C_{1-8}$ alkoxy group or $C_{6-188}$ aryloxy group. An effective amount of a phase transfer catalyst may be about 0.1 to about 10 wt. % based on the weight of bisphenol in the phosgenation mixture. In another embodiment an effective amount of phase transfer catalyst may be about 0.5 to about 2 wt. % based on the weight of bisphenol in the phosgenation mixture.

Alternatively, melt processes may be used. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury mixer, twin screw extruder, or the like to form a uniform dispersion. Volatile monohydric phenol is removed from the molten reactants by distillation and the polymer is isolated as a molten residue.

The copolyester-polycarbonate resins are also prepared by interfacial polymerization technique, well known to those skilled in the art (see, for example, U.S. Pat. Nos. 3,169,121 and 4,487,896). Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

In addition to the polycarbonates described above, it is also possible to use combinations of the polycarbonate resins with other thermoplastic polymers, for example combinations of polycarbonates and/or polycarbonate copolymers with polyesters, provided that the combination do not significantly impair the desired properties of the compositions, for example the transparency and/or melt stability of the composition. In one embodiment, the haze of the polycarbonate and other thermoplastic polymer is less than about 50%, more specifically less than about 25%, even more specifically less than about 10%. As used herein, a "combination" is inclusive of all mixtures, blends, alloys, and the like.

Suitable polyesters include, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid had been incorporated. Furthermore, it is sometime desirable to have various concentrations of acid and hydroxyl end groups on the polyester, depending on the ultimate end-use of the composition. In one embodiment, specific examples of suitable polyesters include poly(ethylene terephthalate) (PET), poly(1,4-butylene terephthalate) (PBT), (polypropylene terephthalate) (PPT), polycyclohexanedimethanol terephthalate (PCT), polycyclohexanedimethanol cyclohexane dicarboxylate (PCCD) and combinations comprising at least one of the foregoing polyesters or copolymers containing the aforementioned ester linkages. Also contemplated are the above polyesters with a minor amount, e.g., about 0.5 to about 20 percent by weight, of units derived from an aliphatic diacid and/or an aliphatic polyol to make copolyesters.

In one embodiment, the weight average molecular weight of the polyester is about 1,000 to about 100,000, specifically about 2,000 to about 50,000, more specifically less than about 25,000. It is believed that lower molecular weight polyesters are more miscible, and therefore provide combinations having lower haze. Molecular weight may be determined by gel permeation chromatography in dichloromethane using polystyrene standards. Combinations of polyesters of different molecular weights may be used.

The blends of a polycarbonate and a polyester may comprise about 1 to about 99 wt. % polycarbonate and correspondingly about 1 to about 99 wt. % polyester, in particular a polyester containing cycloaliphatic repeat units, specifically a cyclohexyl ring. In one embodiment, the blend comprises about 70 to about 99 wt. % polycarbonate and correspondingly about 1 to about 30 wt. % PCT or PCCD. The foregoing amounts are base on the total weight of the polycarbonate resin and polyester resin. Again, the amounts of any polyester will be selected so as to provide a composition with low haze.

The polycarbonate compositions further comprise a glass to provide reinforcement and dimensional stability to the compositions. In an important feature, the glass is selected so as to provide the desired balance of optical and physical properties to the composition, in particular transparency (as reflected by low haze and high transmissivity) and optionally low yellowness in combination with low coefficient of thermal expansion and high flexural modulus. To achieve these properties, the refractive index of the glass is matched to that that of the thermoplastic resin component (polycarbonate and any other thermoplastic polymer) to within 0.04, that is, the refractive index of the glass and the thermoplastic resin component have values that are within 0.04 of each other over a useful temperature range. It has unexpectedly been found that such matching will provide a composition that has an excellent combination of optical and physical properties, in particular transparency and dimensional stability. Films made of such a composition will have lower CTE and improved flatness, with less tendency toward waviness, while still retaining high transparency and low haze.

In one embodiment the glass has a refractive index that is substantially equivalent to the refractive index of the thermoplastic resin component over a temperature range of about 0° to about 80° C. A glass having a substantially equivalent refractive index has a refractive index that is about 0.001 units to about 0.04 units greater than or less than the refractive index of the resin component, specifically about 0.005 units to about 0.03 units greater than or less than the refractive index of the thermoplastic resin component. The refractive index of the glass is matched to that of the thermoplastic resin component over a temperature range of about 0 to about 100° C., specifically about 0° to about 80° C., and in other cases about 20 to about 70° C. Outside the stated ranges of refractive index and/or temperature, the polycarbonate composition may significantly lose transparency.

Different glasses may be used, such as alkali resistant glass, dense barium crown glass, electrical resistant grade glass, and combinations comprising at least one of the foregoing glasses. Other examples of useful glasses are those identified as "E-glass," "D-glass," "R-glass," E-glass derivatives that are fluorine-free and/or boron-free, and the like, providing they meet the refractive index matching criteria with the resin component as described above. Amounts (percent by weight) of the various components for certain glasses is set forth in Table 1 below.

TABLE 1

| Component | D-Glass | E-Glass | R-Glass |
|---|---|---|---|
| $SiO_2$ | 72–75 | 52–56 | 55–65 |
| $Al_2O_3$ | 0–1 | 12–16 | 15–30 |
| $B_2O_3$ | 21–24 | 5–10 | |
| CaO | 0–1 | 16–25 | 9–25 |
| MgO | | 0–5 | 3–8 |
| ZnO | | | |
| BaO | | | |
| $Li_2O$ | | | |
| $Na_2O + K_2O$ | 0–4 | 0–2 | 0–1 |
| $TiO_2$ | | 0–1.5 | |
| $ZrO_2$ | | | |
| $Fe_2O_3$ | 0–0.3 | 0–0.8 | |
| F | | 0–1 | 0–0.3 |

The glass may be a borosilicate glass that is essentially free of one or more compounds selected from the group consisting of aluminum oxides, boron oxides, and boric acids. In one embodiment the glass is a borosilicate glass that contains less than about 1 wt. % of any one of aluminum oxides, boron oxides, or boric acids. In another embodiment the glass is a borosilicate glass that contains less than about 1 wt. % of any two of aluminum oxides, boron oxides, and boric acids. In another embodiment, the glass is a borosilicate glass than contains less than about 1 wt. % of aluminum oxides, less than about 1 wt. % of boron oxides, and less than about 1 wt. % boric acids. In a specific type of borosilicate glass, the total weight of any aluminum oxides, boron oxides, and boric acids is less than about 1 wt. % of the total weight of the glass.

In another embodiment the glass contains at least about 10 wt. % zirconium oxide ("zirconia"). A glass with a high percentage of zirconia, for instance greater than about 15 wt. % zirconia, may be desirable for refractive index matching and CTE reduction. The glass may comprise about 10 to about 25 wt. % zirconia, or about 18 to about 45 wt. % zirconia. One suitable zirconium oxide glass is available in the form of milled fibers from Nippon Electric Glass under the trade designation ARG fiber (GAP-50). This glass has a specific gravity of 2.72, with a refractive index of 1.594 at 587.56 nanometers (nm), a tensile strength of 1.4 GPa, a maximum elongation of 4 to 2%, an alkali resistivity in a saturated cement solution at 80° C., for 90 hours, with a weight loss of 0.8%. The composition is believed to comprise 61 wt. % $SiO_2$, 17.5 wt. % ($Na_2O+K_2O+Li_2O$), 19.5 wt. % $ZrO_2$; and 2 wt. % ($TiO_2+Fe_2O_3$). It is substantially free of alumina and boron-containing components.

The amount of glass that may generally be used is about 0.05 to about 50 wt. %, specifically about 1 to about 30 wt. %, and more specifically about 5 to about 20 wt. % based on the combined weight of the total filled polycarbonate composition (resin component, glass, and other optional additives as described below). Outside these ranges of glass, the polycarbonate composition may have too high a CTE or may be difficult to melt process. Generally, the glass is particulate, and may be in the form of milled fibers, chopped fibers, powders, flakes, and combinations comprising at least one of the foregoing forms. There is no particular limitation to the shape of the refractive index matching particles, which may be for example, spherical, cylindrical, irregular, plate-like, or fiber-like.

The average largest dimension of the glass particles is generally selected so as to provide the desired balance of optical and physical properties in the filled polycarbonate composition, taking into account any breakage or other decrease in size that may occur during processing of the composition, i.e., during manufacture of the composition into a form suitable for the formation of articles. For example, when in fibrous form, the glass is selected to provide a post-processing aspect ratio (the average ratio of length to diameter (L/d) of the fibers) of up to about 60. The post-processing ratio may further be about 4 to about 50, specifically about 10 to about 40, and more specifically about 20 to about 30. Suitable average diameters of fibrous forms may be about 1 to about 24 micrometers, specifically about 5 to about 22 micrometers and more specifically about 10 to about 13 micrometers. Use of non-round fiber cross sections is possible. For other particulate shapes, the average largest diameter of the glass post-processing may be about 1 to about 20 micrometers, specifically about 3 to about 15 micrometers and more specifically about 4 to about 14 micrometers. Bimodal or higher particle size distributions may also be used. Longer aspect ratios often give better mechanical properties than shorter fibers but may also lead to anisotropy in the film that will be undesirable. In some cases milled glass fibers provide a good balance of properties. A mixture of glass shapes, for instance fibers and flake, can also sometimes be used to advantage.

The glasses may be manufactured by standard processes, for example, by steam or air blowing, flame blowing or mechanical pulling. Glass fibers may be hammer milled to make smaller fibers of various sizes. Glass flakes may be made by several processes, for example by crushing glass bubbles. The glass fibers used in polycarbonate reinforcement are frequently made by mechanical pulling. In one embodiment, the glass fibers are made through an all-electric melting furnace system.

It has further been found that passivation of the glass on at least a portion of its surface can contribute to the balance of properties desired for applications such as back-lit diffuser films. Use of passivated glass accordingly provides a polycarbonate composition with improved melt stability, while still maintaining the unique combination of the above noted physical properties. While not being restricted by any mechanism, it is thought that the passivation agent chemically reacts with sites in the refractive index matching glass to render them inert to reactions that would cause degradation of the polycarbonate.

The passivation agent is selected for compatibility with resin component, particularly the polycarbonate, and its ability to deactivate any active sites on the glass surface that may contribute to resin decomposition. This is in contrast to standard glass treatments, which are generally selected to increase the reactivity of the glass with the matrix, to improve adhesion, for example. While the present passivation process may result in improved adhesion (due to improved wet-out for example), together with the improved melt stability, it is not the primary purpose of passivation. The type and amount of passivating agent is further selected so as to not significantly adversely affect the optical properties and the CTE of the filled polycarbonate composition.

In one embodiment, the passivation agent is a silane, i.e., a compound having a silicon-hydrogen bond. Suitable pasaivation agents include, for example silane compounds of the general formula (10) and (11):

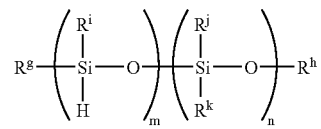

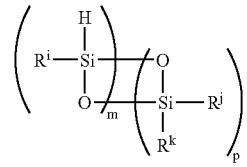

wherein m is greater than or equal to 1; the sum of m and n is equal to 1 to about 10,000; m+p is 3 to about 1000; $R^g$ and $R^i$ are each independently hydrogen, alkyl, aryl, alkylaryl, alkoxy, aryloxy, haloalkyl, haloaryl, and haloalkylaryl; $R^j$ and $R^k$ are each independently alkyl, aryl, alkylaryl, alkoxy, aryloxy, haloaryl, haloaryl, and haloalkylaryl; and $R^h$ is trialkylsilyl, arylalkylsilyl, triarylsilyl, hydrogen, alkyl, aryl, alkylaryl, haloalkyl, haloaryl or haloalkylaryl.

In some instances of formula (10), $R^g$ and $R^i$ may each independently be hydrogen, methyl, ethyl, propyl, trifluoropropyl, phenyl, ethylphenyl, methoxy, ethoxy, and phenoxy; $R^j$ and $R^k$ are each independently methyl, ethyl, propyl, trifluoropropyl, phenyl, ethylphenyl, methoxy, ethoxy, and phenoxy; and $R_5$ is hydrogen, methyl, ethyl, propyl, trifluoropropyl, phenyl, or ethylphenyl. In some instances of formula (11), $R^i$ may be hydrogen, methyl, ethyl, propyl, trifluoropropyl, phenyl, or ethylphenyl; and $R^j$ and $R^k$ are each independently methyl, ethyl, propyl, trifluoropropyl, phenyl, ethylphenyl, methoxy, ethoxy, and phenoxy. Mixtures of passivation agents may also be used. A suitable passivation agent is a silicone fluid available under the trade name DF1040 from GE Silicones, which is a trimethyl silyl-capped methyl hydrogen silicone of formula 10 wherein $R^g$ and $R^i$ are methyl, $R^h$ is a trimethyl silyl, n=0 and m=about 16.

It has been found that careful adjustment of the molecular weight and amount of silicon hydride passivating agents such as those described by formulas (10) and (11) results in compositions with both improved melt stability and excellent optical and physical properties. If too much of the passivating agent is used with too high a molecular weight, it may increase melt stability but also increase haze. In contrast, by excessively lowering the molecular weight of the passivating agent, the passivating agent can become too volatile and will escape the machinery during standard processing temperatures, for example 300° C. One embodiment, the type, amount, and molecular weight of the passivating agent is selected to provide compositions with a percent haze of below about 20% and a glass transition temperature (Tg) of greater than about 120° C. Still further, the type, amount, and molecular weight of the passivating agent may be selected so as to maintain the desired color of the composition, i.e., to shift the color of the composition by less than about 10 delta E units, specifically less than 5 delta E units.

To achieve these results, the silane compound generally has a molecular weight of about 100 to about 10,000, specifically about 200 to about 5000 and more specifically about 200 to about 1000 absolute molecular weight. In one possible embodiment, compounds of formulas 10 and 11 wherein m+n=3 to about 100 and m+p=3 to about 50 may be desired to provide less volatility but still be of low enough molecular weight to retain good optical properties. The silane compound may be used in an amount of about 0.001 to about 5.0 wt. % of the filled polycarbonate composition at a molecular weight of about 500, specifically in an amount of about 0.001 to about 1.0 wt. % of the filled polycarbonate composition at a molecular weight of about 500, and more specifically in an amount of about 0.01 to about 0.5 wt. % of the filled polycarbonate composition at a molecular weight of about 500. In some instances where a silane passivation technique is employed, the composition will retain at least about 70% of its original weight average molecular weight (Mw), as measured by gel permeation chromatography, after melt processing at about 300 ° C.

Methods of treating glasses with a passivating agent are varied and known to those skilled in the art. In one particular aspect of treating the glass, a number of particles, e.g., filaments, may be formed simultaneously, treated with the passivating agent, and then bundled into what is called a strand. Alternatively the strand itself may be first formed of filaments and then treated with the passivating agent. In another embodiment, the passivating agent is added to the glass during processing of the filled polycarbonate composition as described below. Often the glass, especially if used in a milled, powder of flake form, may be blended with the passivation agent prior to melt blending with the polycarbonate resin.

The polycarbonate compositions may be manufactured by methods generally available in the art, for example, in one embodiment, powdered polycarbonate resin, glass, and other optional components (including the passivating agent) are first blended, for example in a Henschel high speed mixer or paint shaker. Other low shear processes such as hand mixing or tumble blending, may also be used.

The blend may then be fed into the throat of an extruder via a hopper. The extruder is generally operated at a temperature higher than that necessary to cause the composition to flow. Standard melt processing conditions may be used, for example temperatures from 250 to 350° C., specifically temperatures from 275 to 300° C. with screw speeds of 50 to 400 rotations per minute (rpm), specifically 100 to 300 rpm. Processing can be done on single screw or twin-screw extruders or other processing equipment. Vacuum venting is often beneficial as is drying the components prior to mixing. Passivating agents may be metered into the mixing devices during compounding. Alternatively, one or more of the components may be incorporated into the composition by feeding directly into the extruder at the throat and/or downstream through a side stuffer. Additives (including the passivating agent) may also be compounded into a masterbatch with the glass and fed into the extruder.

The extrudate is generally immediately quenched in a water batch and pelletized. The pellets so prepared when cutting the extrudate may be about one-fourth inch (6.35 millimeters (mm)) long, or less, and contain finely divided, uniformly dispersed glass in the blend composition. Such pellets may be used for subsequent molding, shaping, or forming.

In addition to glass and a resin component (polycarbonate and other optional polymer), the polycarbonate composition may further include various components and other additives ordinarily incorporated in resin compositions of this type, for example impact modifiers, fillers, heat stabilizers, light stabilizers, antioxidants, mold release agents, lubricants, flame retardants, anti-drip agents, and the like, as well as combinations of various types of additives. It is to be understood that the type and amounts of such components and additives are selected so as to not significantly adversely affect the desired properties of the compositions, in particular haze, transparency, and coefficient of thermal expansion as described in more detail below.

Suitable heat stabilizers include, for example, phosphites, phosphonites, mixtures of phosphites, phosphonites, hindered phenol antioxidants and combinations comprising at least one of the foregoing heat stabilizers. Heat stabilizers are generally present in amounts of about 0.001 to about 1.0 parts by weight, based on 100 parts by weight of the resin component.

Suitable antioxidants include, for example, phosphonates, organophosphites such as tris(nonyl phenyl)phosphite, tris (2,4-di-t-butylphenyl)phosphite, bis(2,4-di-t-butylphenyl) pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.001 to about 1.0 part by weight, based on 100 parts by weight of the resin component.

Suitable light stabilizers include, for example, benzotriazoles such as 2-(2-hydroxy-5-methylphenyl)benzotriazole, 2-(2-hydroxy-5-tert-octylphenyl)benzotriazole and 2-hydroxy-4-n-octoxy benzophenone or the like or combinations comprising at least one of the foregoing light stabilizers. Light stabilizers are generally used in amounts of about 0.1 to about 10.0 parts by weight, based on 100 parts by weight of the resin component.

Suitable antistatic agents include, for example, glycerol monostearate, sodium stearyl sulfonate, sodium dodecylbenzenesulfonate or the like, or combinations of the foregoing antistatic agents. In one instance phosphonium salts of fluorinated alkyl sulfonic acids, such as may be used. The phosphonium sulfonate may be fluorinated phosphonium sulfonate and is composed of a fluorocarbon containing an organic sulfonate anion and an organic phosphonium cation. Examples of such organic sulfonate anions include perfluoro methane sulfonate, perfluoro butane sulfonate, perfluoro hexane sulfonate, perfluoro heptane sulfonate, and perfluoro octane sulfonate. Examples of the aforementioned phosphonium cation include aliphatic phosphonium such as tetramethyl phosphonium, tetraethyl phosphonium, tetrabutyl phosphonium, triethylmethyl phosphonium, tributylmethyl phosphonium, tributylethyl phosphonium, trioctylmethyl phosphonium, trimethylbutyl phosphonium trimethyloctyl phosphonium, trimethyllauryl phosphonium, trimethylstearyl phosphonium, triethyloctyl phosphonium and aromatic phosphoniums such as tetraphenyl phosphonium, triphenylmethyl phosphonium, triphenylbenzyl phosphonium, tributylbenzyl phosphonium. Antistatic agents are generally used in amounts of about 0.1 to about 10 parts by weight, based on 100 parts by weight of the resin component.

Suitable mold releasing agents include for example, stearyl stearate, pentaerythritol tetrastearate, beeswax, montan wax, paraffin wax, or the like, or combinations comprising at least one of the foregoing mold release agents. Mold releasing agents are generally used in amounts of about 0.01 to about 5.0 parts by weight, based on 100 parts by weight of the resin component.

Suitable UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB 5411); 2-hydroxy-4-n-octyloxybenzophenone (CYASORB 531); 2-[4,6-bis(2,4-dimethylphenyl)-1,3,5-triazin-2-yl]-5-(octyloxy)-phenol (CYASORB 1164); 2,2'-(1,4-phenylene)bis(4H-3,1-benzoxazin-4-one) (CYASORB UV-3638); 1,3-bis[(2-cyano-3,3-diphenylacryloyl)oxy]-2,2-bis[[(2-cyano-3,3-diphenylacryloyl)oxy]methyl]propane (UVINUL 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. Such nanoparticles may also need to be passivated as described herein to give polycarbonate blends with good melt stability. UV absorbers are generally used in amounts of about 0.10 to about 0.35 parts by weight, based on 100 parts by weight of the resin component.

Suitable lubricants include for example, fatty acid esters such as alkyl stearyl esters, e.g., methyl stearate or the like; mixtures of methyl stearate and hydrophilic and hydrophobic surfactants comprising polyethylene glycol polymers, polypropylene glycol polymers, and copolymers thereof e.g., methyl stearate and polyethylene-polypropylene glycol copolymers in a suitable solvent; or combinations comprising at least one of the foregoing lubricants. Lubricants are generally used in amounts of about 0.1 to about 5.0 parts by weight, based on 100 parts by weight of the resin component.

Suitable dyes include, for example, organic dyes such as coumarin 460 (blue), coumarin 6 (green), nile red or the like; lanthanide complexes; hydrocarbon and substituted hydrocarbon dyes; polycyclic aromatic hydrocarbons; scintillation dyes (preferably oxazoles and oxadiazoles); aryl- or heteroaryl-substituted poly (2–8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as antistokes shift dyes which absorb in the near infrared wavelength and emit in the visible wavelength, or the like; luminescent dyes such as 5-amino-9-diethyliminobenzo(a)phenoxazonium perchlorate; 7-amino-4-methylcarbostyryl; 7-amino-4-methylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenyl)-6-phenylbenzoxazole-1,3; 2,5-Bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-diethylamino-4-methylcoumarin; 7-diethylamino-4-trifluoromethylcoumarin; 2,2'-dimethyl-p-quaterphenyl; 2,2-dimethyl-p-terphenyl; 7-ethylamino-6-methyl-4-trifluoromethylcoumarin; 7-ethylamino-4-trifluoromethylcoumarin; nile red; rhodamine 700; oxazine 750; rhodamine 800; IR 125; IR 144; IR 140; IR 132; IR 26; IR5; diphenylhexatriene; diphenylbutadiene; tetraphenylbutadiene; naphthalene; anthracene; 9,10-diphenylanthracene; pyrene; chrysene; rubrene; coronene; phenanthrene or the like, or combinations comprising at least one of the foregoing dyes. Dyes may be used in amounts of about 0.001 to about 3.0 parts by weight, based on 100 parts by weight of the resin component.

Optical brighteners, which are substantially colorless, fluorescent, organic compounds that absorb ultraviolet light and emits it as visible blue light may also be present. Examples include but are not limited to stilbenes such as derivatives of 4,4'-diaminostilbene-2,2'-disulfonic acid, bis benzoxazoyl thiophenes, for example UVITEX OB from Ciba Geigy, 2,5-bis(5-tert-butyl-2-benzoxazolyl) thiophene, oxazinones such as CARTAX CXDP form Clairant, coumarin derivatives such as 4-methyl-7-diethylaminocoumarin, 1,4-bis(O-cyanostyryl) benzol, and 2-amino-4-methylphenol. Optical brighteners may be used in amounts of about 0.001 to about 3.0 parts by weight, based on 100 parts by weight of the resin component.

Suitable flame retardants may be organic compounds that include perfluoroalkyl groups, phosphorus, bromine, and/or chlorine. Non-brominated and non-chlorinated flame retardants may be preferred in certain applications for regulatory reasons. When present, phosphorus-containing flame retardants may be present in amounts of about 1.0 to about 20 parts by weight based on 100 parts by weight of the resin component.

Various salts may be used as flame retardants, for example sulfonate salts such as potassium perfluorobutane sulfonate (Rimar salt) and potassium diphenylsulfone sulfonate, as well as the perfluoroalkane sulfonates described in U.S. Pat. No. 3,775,367 or the like; or alkali metal or alkaline earth metal (such as lithium, sodium, potassium, magnesium, calcium and barium) salts such as $Na_2CO_3$, $K_2CO_3$, $MgCO_3$, $CaCO_3$, and $BaCO_3$, $Li_3AlF_6$, $BaSiF_6$, $KBF_4$, $K_3AlF_6$, $KAlF_4$, $K_2SiF_6$, $Na_3AlF_6$, or the like. When present, such flame retardant salts may be used in amounts of about 0.001 to about 1.0 parts by weight, more specifically about 0.1 to about 0.5 parts by weight, based on 100 parts by weight of the resin component.

Shaped, formed, or molded articles comprising the polycarbonate compositions are also provided. The polycarbonate compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. In addition, the polycarbonate compositions may be used for such application as backlit displays and other devices such as organic light emitting diodes, advertising displays, score boards, business equipment displays, electronic game displays, medical device displays, and telephones.

The polycarbonate compositions are generally transparent, that is, they have low haze and high transmission. As is known in the art, obtaining transparent compositions is difficult, as many known additives significantly adversely affect transparency. The percent haze of a composition may be determined in accordance with ASTM D1003, and calculated using formula (i):

$$\% \text{ Haze} = 100 \times \frac{\text{Total Diffuse Transmission}}{\text{Total Transmission}} \quad (i)$$

In formula (i) the total transmission is the integrated transmission and the total diffuse transmission is the light transmission that is scattered by the film. The polycarbonate composition has a percent haze of less than about 20%, specifically less than about 15%, more specifically than about 10%, wherein the percentages are calculated as indicated above. Outside of these ranges of haze the polycarbonate may not be sufficiently transparent.

In addition, the polycarbonate composition has a percent total light transmittance of greater than about 70%, specifically greater than about 80%, and more specifically greater than about 88%. Percent transmission (% T) may be measured as per ASTM D1003 on 3.2 mm injection molded parts. Outside of these ranges of haze and transmission the polycarbonate may not be sufficiently transparent. In one embodiment a haze of less than about 20% and a percent transmission of greater than about 80% are maintained at a useful temperature range, i.e., generally about 0° C. to about 100° C., specifically about 0° C. to about 80° C., or about 20° C. about 70° C.

Optionally, in addition to transparency, the polycarbonate composition may have a yellowness index of less than about 10, specifically less than about 5. Yellowness index (YI) may be measured on 3.2 mm injection molded chips as per ASTM method D1925.

The coefficient of thermal expansion (CTE) is the fractional increase in length per unit rise in temperature. The exact definition varies in the art depending on whether it is specified at a precise temperature (true coefficient of thermal expansion) or over a temperature range (mean coefficient of thermal expansion). The mean coefficient of thermal expansion is used in this disclosure. The temperature range used for the mean coefficient of thermal expansion is 20° C. to 70° C. In general the CTE can vary from about 20 to about 70 um/m/° C. In some instances it may be from about 15 to about 40 um/m/° C. CTE may be measured on films or on molded parts as described in ASTM E831.

It is believed that adjustment of the CTE of the thermoplastic resin component leads to the decreased waviness of the flat films. Films, particularly light diffusing films may be tested to evaluate their robustness to conditions of elevated temperatures and elevated levels of relative humidity. For example, a film having a nominal thickness of 140 micrometers is produced and cut into several rectangular pieces suitable for use in a 15 inch (about 38 centimeter) backlight module. Two such cut films are each placed on a glass plate having a larger width and length than the film. The maximum height of the bottom of any edge of the film above the glass plate (i.e., deviation from flatness) was measured as 0.00 inches, using a rule having a $\frac{1}{100}$-inch (0.254 mm) scale. Each film is then taped to the glass plate at three edges (the two short edges and one of the long edges). One of these (Set A) is placed in a chamber where the temperature is maintained at 65° C. and relative humidity at 95% for a period of 500 hours. The other (Set B) is subjected to a thermal cycling test, by being placed in a chamber where the temperature was cycled between 85° C. and −35° C. (minimal moisture content in the air, e.g., less than or equal to about 60% relative humidity), with the temperature held at each extreme for 1 hour and then changed to the other extreme at a rate of 20° C. per minute. 100 such cycles are run.

After completion of each test, the set is removed from the chamber and placed at 22° C., 50% relative humidity for 14 days. The tapes are removed from the edges of the film and the maximum deviation from flatness at any edge is measured. In accordance with this test, the films disclosed herein are capable of having a maximum deviation from flatness, as measured at an edge when placed on a glass plate of less than or equal to about 0.1 inches (about 0.3 centimeters), more specifically less than or equal to about 0.05 inches (about 0.1 centimeter), even more specifically less than or equal to about 0.02 inches (about 0.05 centimeter). The glass filled light-diffusing films are also capable of having a maximum deviation from flatness, as measured after a high heat, high humidity or thermal cycling test as described above of less than 0.1 inches (about 0.3 centimeters), more specifically less than 0.05 inches (about 0.1 centimeter), even more specifically less than 0.03 inches (about 0.08 centimeter). Furthermore, the glass filled light-diffusing film has an average defect size of less than or equal to about 0.2 millimeters, wherein the average defect is a numerical average of a major diameter of the defect and a minor diameter of the defect.

In addition to the foregoing combination of excellent optical properties and improved flatness, the polycarbonate compositions may additionally have good physical and mechanical properties.

One particularly advantageous property is melt stability, which as used herein is the resistance to molecular weight degradation of the polymer as reflected by the weight average molecular weight. In addition to a low coefficient of thermal expansion, as described above, the polycarbonate composition may have an improved melt stability at high temperatures, e.g., about 250° C. to about 350° C. Melt stability may be measured using a melt viscosity index according to ASTM D1238 wherein the melt viscosity over a 18 minute period (cm³/10 min) at 300° C. is compared to the melt viscosity measured over a 6 minute time span under the same conditions. Retention of at least about 70% of the initial, 6 minute, melt viscosity value after 18 minutes at 300° C. is preferred. The polycarbonate compositions may have a melt viscosity index at 300° C. of generally about 0.5 to about 30 cm³/10 min, or about 1.0 to about 20.0 cm³/10 min or further about 5.0 to about 15.0 cm³/10 min. Outside these ranges of melt stability the polycarbonate may be difficult to process into film or have poor mechanical properties. Polycarbonate compositions with superior melt stability will show retention of at least about 70% of their initial melt viscosity after heating for about 18 minutes at 300° C. Alternatively, compositions with sufficient melt stability may have a molecular weight degradation, after thermal processing at 300° C. for 18 minutes, of less than about 30%, specifically less than about 25%, and more specifically less than about 15% of the initial weight average molecular weight of the polycarbonate.

In addition, the polycarbonate compositions may have a melt volume ratio (MVR) of about 0.5 to about 30, more specifically about 1.0 to about 20 cm³/10 minutes, measured at 300° C. in accordance with ASTM D1238.

The polycarbonate compositions may further have a heat deflection temperature (HDT) of about 120 to about 170° C., or about 130 to about 150° C., measured at 0.45 Mpa on 3.2 mm bars r according to ASTM D 648.

The polycarbonate compositions may further have a Notched Izod Impact (NII) of about 50 to about 200 Joules per meter (J/m), specifically about 100 to about 150 J/m measured at 23° C. using 3.2 mm bars in accordance with ASTM D256.

The flexural modulus of the polycarbonate composition may generally be about 2500 to about 10000 MPa, measured at 23° C. using 3.2 mm bars in accordance with ASTM D790. The filled polycarbonate compositions may be used to form films, specifically a film of optical quality, and more specifically a flat film of optical quality. Such films are useful as diffuser films.

The films may be formed by processes such as film and sheet extrusion, injection molding, gas-assist injection molding, extrusion molding, compression molding, blow molding, and combinations comprising at least one of the foregoing processes. Film and sheet extrusion processes may include and are not limited to melt casting, blown film extrusion and calendaring. Co-extrusion and lamination processes may be used to form composition multi-layer films or sheets. Single or multiple layers of coatings may further be applied to the single or multi-layer substrates to impart additional properties such as scratch resistance, ultra violet light resistance, aesthetic appeal, and the like. Coatings may be applied through standard application techniques such as rolling, spraying, dipping, brushing, flow coating, or combinations comprising at least one of the foregoing application techniques. The disclosed film and sheets may alternatively be prepared by casting a solution or suspension of the composition in a suitable solvent onto a substrate, belt or roll followed by removal of the solvent.

Oriented glass filled PC films may be prepared through blown film extrusion or by stretching cast or calendared films in the vicinity of the thermal deformation temperature using standard stretching techniques. For instance, a radial stretching pantograph may be employed for multi-axial simultaneous stretching; an x-y direction stretching pantograph may be used to simultaneously or sequentially stretch in the planar x-y directions. Equipment with sequential uniaxial stretching sections may also be used to achieve uniaxial and biaxial stretching, such as a machine equipped with a section of differential speed rolls for stretching in the machine direction and a tenter frame section for stretching in the transverse direction.

In one embodiment, the thin films may have of a thickness of about 0.01 to about 3.0 millimeters (mm), specifically about 0.1 mm to about 1.0 mm and more specifically 0.1 to 0.5 mm. The thin films may be used in a backlit module display, more specifically a backlit module display that provides a reduced amount of waving. Reduced waving in polycarbonate films is obtained through a decrease in the coefficient of thermal expansion. In one embodiment, the coefficient of thermal expansion of the filled polycarbonate films is reduced up to about 70% over films without the glass. Other devices that may use the filled polycarbonate compositions include for example, liquid crystal TV screens and computer displays as well as flexible substrates for organic light emitting diode applications.

The filled polycarbonate compositions may also be used to form a multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and where the first side of the plurality of ribs is opposed to the second side of the plurality of ribs. The multiwall sheet is configured to not impede the desired physical properties of the article.

The films and sheets described above are further thermoplastically processed into shaped articles via forming and molding processes including but not limited to thermoforming, vacuum forming, pressure forming, injection molding and compression molding. Multi-layered shaped articles may be formed by injection molding a thermoplastic resin onto a single or multi-layer film or sheet substrate by first providing a single or multi-layer thermoplastic substrate having optionally one or more colors on the surface, for instance, using screen printing or a transfer dye; conforming the substrate to a mold configuration such as by forming and trimming a substrate into a three dimensional shape and fitting the substrate into a mold having a surface which matches the three dimensional shape of the substrate; then injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

Some additional advantages of using the filled polycarbonate compositions described above over polycarbonate without refractive index matching glass may be that the opacity of the filled polycarbonate composition to UV light improves UV resistance; and/or that the glass increases the modulus, the heat distortion temperature, the flame resistance, the chemical resistance, and/or the scratch resistance of the thermoplastic resin component.

The following examples are merely illustrative and are not intended to limit the scope of the disclosure in any way.

EXAMPLES

A typical process comprises dry blending the polycarbonate resin, any additives, and the glass, compounding the same in a twin-screw extruder and pelletizing, followed by film extrusion of the pellets. Table 2 sets forth the general formulation of the dry blend. The polycarbonate powder used was LEXAN® 105 from General Electric, having a Mw of about 30,000 with a MVR at 300° C. of about 7.0 $cm^3/10$ min.

TABLE 2

| Raw material | Weight Percent |
| --- | --- |
| Polycarbonate powder | 80–100 |
| Mold release agent | 0.145 |
| Phosphite Stabilizer | 0.095 |
| Antistatic additive | 0.750 |
| Glass | 0–20 |

The glasses used in the following examples are shown in Table 3. In Table 3, "ARG" is a boron compound and alumina-free milled glass, grade ARG from Nippon Electric Glass (NEG) Co., "ECR" is a corrosion resistant fiber glass from the Fiberex Co., "DBC" is a dense barium crown glass from Pilkington Co., and "E Glass" is borosilicate glass fibers from either PPG Co. or NEG, or a milled borosilicate glass from Owens Corning (OC) Co.

TABLE 3

| Glass type, form | Grade name | Supplier | Refractive index, $n_d$ | Average Diameter, μm | Average post-processing aspect ratio |
|---|---|---|---|---|---|
| ARG, milled fiber | GAP-50 | NEG | 1.594 | 13 | 4 |
| ECR, chopped fiber | 503-K-275 | Fiberex | 1.576 | 13 | 13 |
| DBC, powder | DBC589 | Pilkington | 1.589 | 4.2 | 1 |
| E-chopped, fiber | Chop Vantage 3540 | PPG | 1.550 | 10 | 25 |
| E milled, fiber | 737 BC | OC | 1.550 | 14 | 4 |
| E chopped, fiber | T-511 | NEG | 1.550 | 13 | 60 |

The samples were prepared using a W-P 30 mm (1.18 inches) twin screw extruder with an aspect ratio set at length/diameter of 29. The barrel temperature was 480° F. to 550° F. (249° C. to 288° C.) and the die temperature was 550° F. (288° C). The screw speed was set at 30 rpm and the screw torque was set at 80%.

After being compounded and pelletized, the samples was extruded into a film using a Killion single screw extruder with a Mega Machinery calendaring line (single screw extruder, film die, and calendaring roll stack) to extrude the resin batches into films with a matte/polish or a polish/polish texture. The operating conditions included a barrel zone temperature of 480° F. to 590° F. (249° C. to 310° C.); a die zone temperature of 580° F. to 590° F. (304° C. to 310° C.); a screw speed of 30 rpm and a die width of 16 inches (406 mm). For production of the matte/polish texture, the calendaring roll setup was as follows: Roll Position 1 used textured (40 microinches (0.04 mil) Ra nominal) silicone rubber, which was 0.375 inches (9.525 mm) thick; and, alternatively Roll Position 2 used a polished chromed steel roll where the chrome roll temperature was 210° F. to 284° F. (100° C. to 140° C.), the rubber roll temperature was 120° F. to 140° F. (49° C. to 60° C.), which produced a film thickness of 0.005 to 0.012 inches (0.127 mm to 0.305 mm). Alternatively, polished chrome steel rolls were used in both Roll 1 and Roll 2 positions to produce a polish/polish texture.

The samples were analyzed and it was found that use of glass lowered the coefficient of thermal expansion. Glass loadings of 5 wt. % or higher and aspects ratios of 4 and higher were found to result in significant coefficient of thermal expansion reduction, which translated into a significant improvement in the waving performance of the films in the backlit module set up, compared with the current films made of straight polycarbonate.

Figure 2:
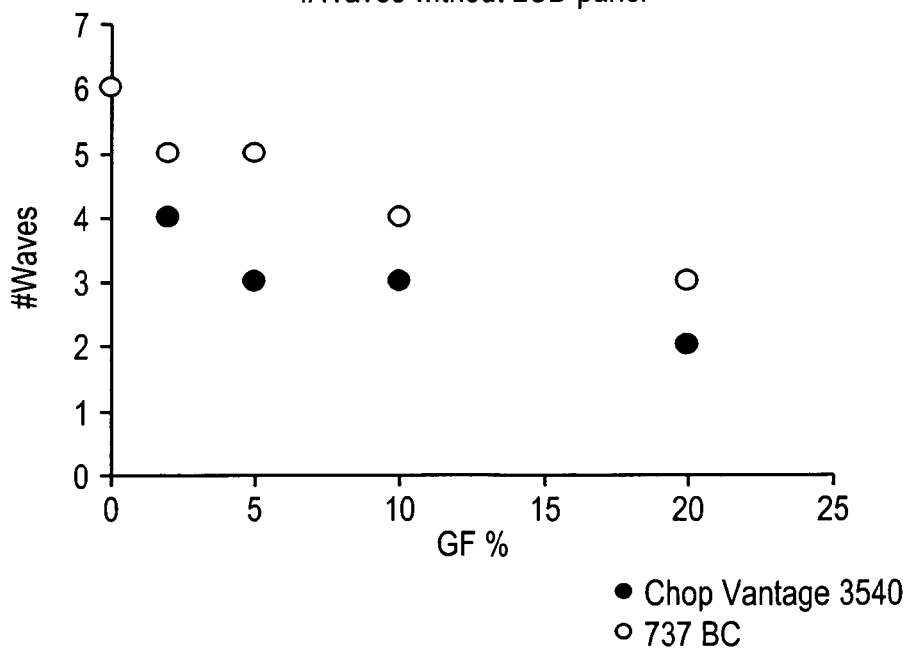
FIG. 2 is a graph of the number of waves formed by a diffuser film directly on top of a backlit module without an LCD panel as the amount of glass loading increases.

FIG. 1 shows the decrease in coefficient of thermal expansion as the glass loading of various glasses are added to polycarbonate. The reduction in coefficient of thermal expansion is translated into an improvement of waving performance of the composition films in a 14-inch (355.6 mm) notebook backlit module setting as is shown in FIG. 2, wherein the number of waves formed by the diffuser film directly on top of the 14-inch backlit module (light guide pipe) decreases as the glass loading of both milled and chopped glass fibers increases. Table 4 shows the number of waves formed by the top diffuser film visible through the LCD panel in a 15-inch (381 mm) notebook display using some of the glasses as described in Table 3.

TABLE 4

| Wt. % Glass in Polycarbonate | Glass Type | Number of Waves |
|---|---|---|
| 0 | — | 4 |
| 2 | Chop Vantage 3540 | 3 |
| 5 | | 0 |
| 10 | | 0 |
| 20 | | 0 |
| 2 | 737 BC | 5 |
| 5 | | 0 |
| 10 | | 0 |
| 20 | | 0 |
| 5 | DBC589 | 2 |
| 10 | | 2 |
| 20 | | 2 |
| 5 | ARG GAP-50 | 0 |
| 10 | | 0 |
| 20 | | 0 |

Table 4 shows that samples loaded with at least 5 wt. % glass with an aspect ratio of 4 or more give the best improvement, with no waving visible through the LCD panel.

Figure 3:
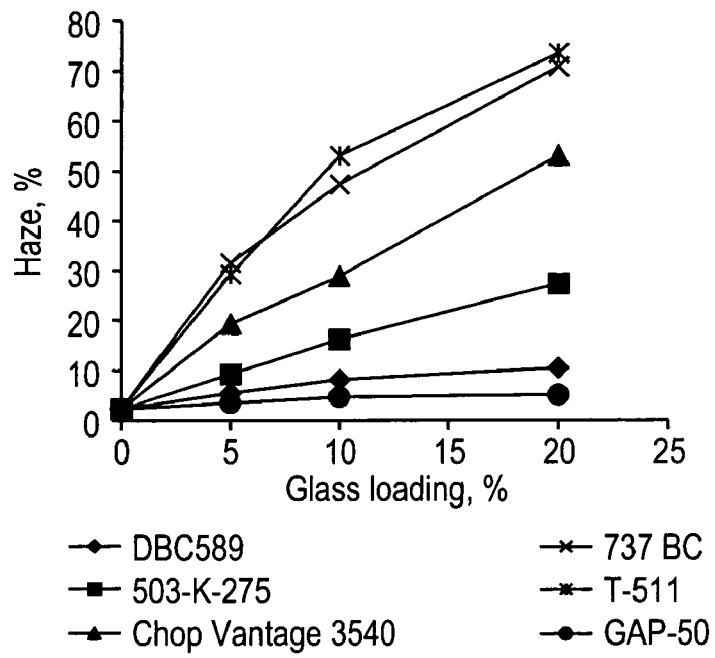
FIG. 3 is a graph of the optical characterization results of haze in various films as the amount of glass loading increases.
Figure 4:
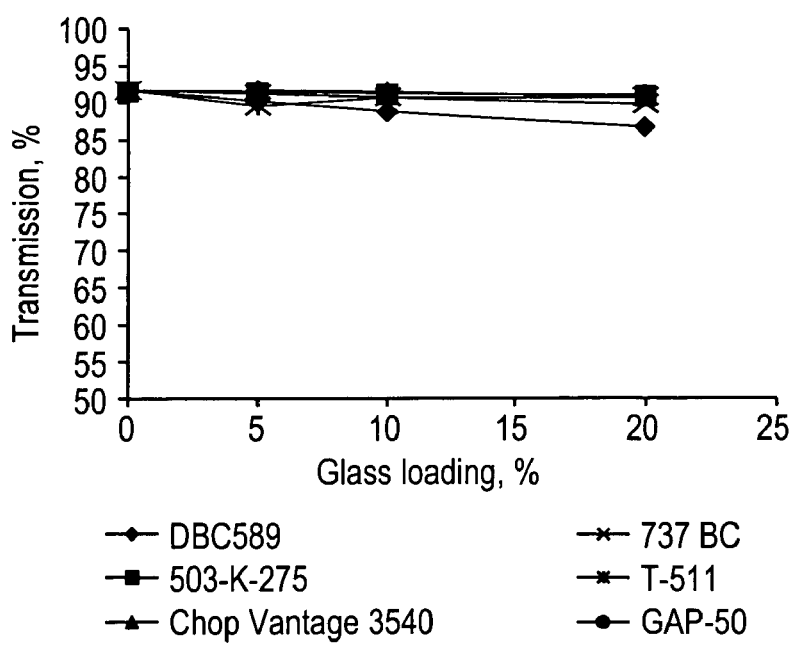
FIG. 4 is a graph of the optical characterization results of transmission in various films as the amount of glass loading increases.

FIGS. 3 and 4 show the haze and total transmission for polish/polish films of 12 mils (305 micrometers) thickness. The extruded films were compressed in a Greenerd Hydrolair Model CPA-50 press under a pressure of 2000 psi (13.8 MPa) at a temperature of 525° F. (274° C.). The extruded films were preheated for 1 minute at 0 psi, and then compression molded for 1 minute at 2000 psi (13.8 MPa), and cooled for 1 minute at 2000 psi (13.8 MPa).

Measurements were taken using a BYK Gardner Haze-Gard Plus instrument from BYK-Gardner. Haze values are significantly reduced as the refractive index difference between polycarbonate and the glass is brought to less than 0.01 (503-K-275, DBC589 and GAP-50). The best results are obtained with the GAP-50 glass for which haze remains below 5% even at loadings as high as 20%. The predicted and measured percent haze is calculated as indicated above where total transmission is the integrated transmission and the diffuse transmission is the light transmission that is scattered by the film as defined by ASTM D 1003.

The diffuser films characterized in Table 5 are reinforced with three types of glasses, each with a different refractive index. E chopped fiber ($n_d$=1.550), ECR chopped fiber ($n_d$=1.576) and DBC powder ($n_d$=1.589). The ECR chopped fiber shows no decrease in luminance even at 20 wt. % loading when compared to polycarbonate without glass. Comparing ECR chopped fiber and E chopped fiber shows the importance of the refractive index in maintaining high luminance. DBC powder is an exception due to the fact that samples containing this glass showed discoloration associated with polycarbonate degradation (35% decrease in molecular weight of polycarbonate at 20 wt. % loading of DBC powder). This also caused the drop in percent transmission in FIG. 4 for this glass.

Table 5 shows the ratio of luminance of various filled polycarbonate films to the luminance of a commercially available polycarbonate film that contains no glass.

TABLE 5

| % Glass | ARG | DBC | E (T511) | ECR |
|---|---|---|---|---|
| 5 | 100.7 | 99.57 | 98.25 | 101.63 |
| 10 | 95.3 | 96.25 | 96.88 | 102.06 |
| 20 | — | 94.52 | 93.71 | 100.28 |

The ECR chopped fiber shows no decrease in luminance even at 20 wt. % loading when compared to polycarbonate without glass. The DBC powder samples showed discoloration associated with polycarbonate degradation (35% decrease in molecular weight of polycarbonate at 20 wt. % loading of DBC powder). This also caused the drop in percent transmission in FIG. 4 for this glass.

The film made from a polycarbonate composition containing alkali resistant glass was assessed for suitability of use as a top diffuser by placing it in a commercial liquid crystal display (model LP121X04 (A2) manufactured by LG Philips) in place of the pre-existing top diffuser film. The luminance at a zero degree view angle (i.e., on-axis) was measured (with the liquid crystal panel removed) using an Eldim EZ Contrast 160D instrument, and found to be 100.7% of the value obtained when a commercial top diffuser, DL4248 manufactured by GE Structured Products and described in U.S. patent application Ser. No. 10/787,158, was used. Therefore, the luminance was at least 90% of that measured for the commercial top diffuser.

It was observed that use of the alkali resistant glass may result in voids and/or bubbles in the pellets and on the films made the filled polycarbonate compositions. Treatment of the glass with DF1040, a hydroxyl-capped polydimethylhydrogen siloxane available from General Electric Company prevented the formation of voids and/or bubbles. Table 6 below shows the molecular weight and melt volume rate results exhibited with the low amounts of DF1040 passivation on glass-protected polycarbonate. As shown in Table 6, MVR values at 6 and 18 min (15.8 and 15.4 cm3/10 min, respectively) for non-passivated glass filled PC (Example 2–7) is higher than the all other batches prepared with DF1040 passivation. Significant decomposition has happened even during the 6 minute heating period. DF581 is a hydroxyl-capped polydimethylsiloxane having no silicon hydride groups

TABLE 6

| Ex. No. | DF1040 | DF581 | Mol. Wt. | Decrease in MW (%)** | MVR at 6 min (cm³/10 min at 300° C.) | MVR at 18 min (cm³/10 min at 300° C.) |
|---|---|---|---|---|---|---|
| 1-1 | 2 | 0 | 27536 | 4.58 | 9.75 | 8.80 |
| 2-1 | 1 | 0 | 27754 | 3.83 | 9.99 | 10.74 |
| 2-2 | 0.5 | 0 | 28195 | 2.30 | 8.93 | 9.50 |
| 2-6 | 0.25 | 0 | 27949 | 3.16 | 10.3 | 9.21 |
| 2-4 | 0.125 | 0 | 28177 | 2.36 | 10.2 | 9.59 |
| 2-7 | 0 | 0 | 25693 | 10.97 | 15.8 | 15.38 |
| 1-6 | 2 | 1 | 27271 | 5.51 | 9.83 | 8.89 |
| 1-5 | 1 | 1 | 27905 | 3.31 | 8.94 | 9.05 |
| 2-5 | 0 | 1 | 27449 | 4.89 | 11.9 | 11.29 |
| A** | 0 | 0 | 28860 | 0 | 8.55 | 7.96 |

*Control
**Sample A, polycarbonate with no glass

It may be seen from the above data that DF581 is not as effective as DF1040 if used alone (Ex. 2-5). Ex. 2-5 it gave a relatively higher MVR value of 11.9 cm³/10 minutes than the batches in which DF1040 had been used alone (e.g., Ex. 2-1).

Table 7 shows haze and transmission values of passivated glass filled polycarbonate film samples (9 wt. % glass in polycarbonate) compared to non-passivated glass as a function of DF1040 percentage on the glass.

TABLE 7

| DF1040 concentration on passivated glass (Wt. %) | Ratio of Haze to non-passivated glass filled sample (Haze1/Haze2) * 100 | Ratio of Transmission to non-passivated glass filled sample (T1/T2) * 100 |
|---|---|---|
| 1 | 105.46 | 96.55 |
| 0.5 | 103.56 | 98.88 |
| 0.250 | 101.06 | 99.09 |
| 0.125 | 100.52 | 100.27 |
| 0 | 100 | 100 |

A loss of transparency was noted when DF1040 was used in amounts of 2 wt. % or above, in that compounded pellets containing the passivated glass were white and opaque color. However, when lower amounts of DF1040 were used e.g., 1 to 0.125 wt. %, as shown in Table 7, the change in haze and transmission were much less. Good haze and transmission were obtained with 0.125 wt. % DF1040. Passivation at this concentration gave only a 0.5% increase in haze and a 0.27% change in transmission compared to non-passivated glass. These results showed that DF1040 passivation of alkali resistant glass is quite effective at lower concentrations (0.25 wt. % or less on a glass surface) to prevent the melt decomposition of polycarbonate without losing the transparency of the films.

In order to evaluate the performance of the glass filled films compared to current commercial top diffuser films, haze and transmission of polycarbonate films were measured by putting the filled films behind the commercial film so that the glass filled film was faced toward the light source in a BYK Gardner machine. Alkali resistant glass filled polycarbonate films were also measured for haze and transmission as single films for a comparison as is shown in Table 8. A refractive index matching liquid was used to prevent any measurement error due to air spaces between the films. Table 8 shows the Transmission (T) and Haze (H) comparison of alkali resistant glass filled polycarbonate films with GE top diffuser film as single and double film configurations.

TABLE 8

| Example | Single film (% transmission) | Single film (% haze) | Glass filled film/Top diffuser film (% transmission) | Glass filled film/Top diffuser film (% haze) |
|---|---|---|---|---|
| Commercial top diffuser film | 90.97 | 38.4 | 90.97 | 38.4 |
| PC/10% ARG | 88.00 | 15.50 | 86.7 | 45.9 |
| Run No. 10 (PC/5% ARG) | 90.00 | 14.57 | 86.7 | 45.9 |
| Run No 5 (PC/5% ARG) | 89.83 | 5.66 | 89.5 | 38.6 |

The results as reported in Table 8 show that the ARG glass did not affect the transmission and haze values to a great extent. It is noted that top light-diffusing films, i.e., the light-diffusing film nearest to the liquid crystal display, generally have a haze value of less than or equal to 85%, more particularly a haze value of less than or equal to 50%.

Therefore, the change in haze and transmission is small enough to not change the optical properties of films in the LCD applications.

It should be noted that resin molecular weight (melt flow rate) and therefore film process conditions play a role in the final properties of the films. For example, as is shown in Table 8, run number 5 is the lowest haze film (having a haze value of 5.7% and a coefficient of thermal expansion of 62 ppm um/m/° C.) containing alkali resistant glass (5 wt. % glass in polycarbonate). It was produced using high flow (lower molecular weight with a melt flow index of 17.5 cm³/10 min) polycarbonate resin at low die temperature (480° F., 249° C.) with chrome roll temperatures of 280° F. (138° C.) and with a screw rate of 20.0 rpm at a melt pressure of 950 psi. Similarly, run number 10 is the standard polycarbonate resin (melt flow index of 7.5 cm³/10 min) that was produced at 480° F. (249° C.) die temperatures with a lower roll temperature of 210° F., (99° C.) and at a higher screw rate of 60 rpm. The film produced at run number 10 had a lower coefficient of thermal expansion but a relatively higher haze than run number 5. (CTE: 48 um/m/° C., single film haze 14.6%).

The singular forms "a," "an," and "the" include plural referents unless the context clearly dictates otherwise. The endpoints of all ranges directed to the same amount, property, or characteristic are inclusive and independently combinable. All references are incorporated herein by reference.

Although the disclosed compositions have been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from essential scope thereof. Therefore, it is intended that the disclosure not be limited to the particular embodiment disclosed as the best mode contemplated for carrying out this invention, but that the disclosure will include all embodiments falling within the scope of the appended claims.

The invention claimed is:

1. A film comprising in admixture:
a thermoplastic resin component comprising a polycarbonate; and
a glass having a refractive index within 0.04 of the thermoplastic resin component, wherein the glass is essentially free of compounds selected from the group consisting of aluminum oxides, boron oxides, boric acids and a combination comprising at least one of the foregoing;
wherein the glass has been passivated with a passivating agent containing a silicon hydride functionality, wherein the passivating agent is of the formula (10) or (11);

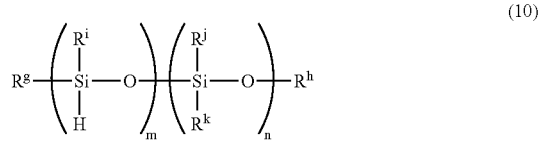

(10)

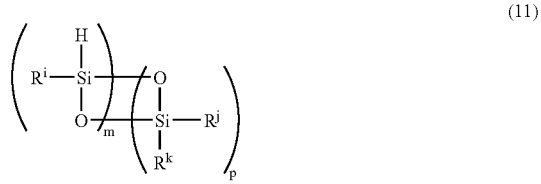

(11)

wherein m is greater than or equal to 1; the sum of m and n is equal to 1 to 10,000; m+p is 3 to about 1,000; $R^g$ and $R^i$ are each independently hydrogen, alkyl, aryl, alkylaryl, alkoxy, aryloxy, haloakyl, haloaryl, and haloalkylaryl; $R^j$ and $R^k$ are each independently alkyl, aryl, alkylaryl, alkoxy, aryloxy, haloalkyl, haloaryl, and haloalkylaryl; and $R^h$ is trialkylsilyl, arylalkysilyl, triarylsilyl, hydrogen, alkyl, aryl, alkylaryl, haloalkyl, haloaryl, or haloalkylaryl;

wherein the passivating agent is present at about 0.001 to about 1.0 wt. % of the film;

wherein the film has a thickness of about 0.01 to about 3.0 mm; and wherein the film composition has a haze of less than about 20%, a total transmittance of greater than about 70%, and a coefficient of thermal expansion of about 20 to about 70 um/m/° C. measured over a temperature range of 20 to 70° C.

2. The film of claim 1 wherein the polycarbonate composition has a yellowness index of less than about 10.

3. The film of claim 1 with a flexural modulus of at least about 2500 MPa.

4. The film of claim 1 wherein the glass contains greater than about 10 wt. % zirconia.

5. The film of claim 1 where the glass is an alkali resistant glass, a dense barium crown glass, an electrical resistant grade glass, or a combination comprising at least one of the foregoing glasses.

6. The film of claim 1 where the glass is an alkali resistant glass.

7. The film of claim 1 wherein the glass is in the form of milled fibers, chopped fibers, powder, flake or a combination comprising of at least one of the foregoing forms.

8. The film of claim 1 wherein the glass has an aspect ratio of greater than about 4 and less than about 60.

9. The film of claim 1, comprising about 50 to about 995 wt. % thermoplastic resin and about 0.05 wt. % to 50 wt. % glass based on the total weight of the film.

10. The film of claim 1, wherein the passivating agent, containing a silicon hydride functionality is of the formula (10) or (11):

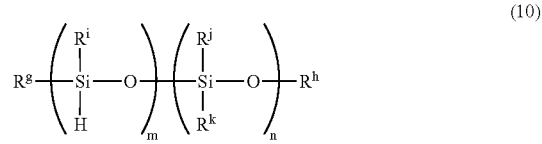

(10)

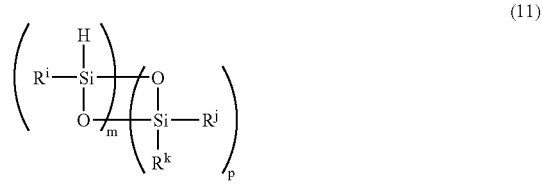

(11)

where m + n = 3 to about 100 and m + p = 3 to about 50.

11. A polycarbonate composition comprising in admixture:
a thermoplastic resin component comprising a polycarbonate; and
a glass having a refractive index that is within 0.04 of the thermoplastic resin component, wherein the glass is essentially free of compounds selected from the group consisting of aluminum oxides, boron oxides, boric acids and a combination comprising at least one of the foregoing;

wherein the glass has been passivated with a passivating agent containing a silicon hydride functionality, wherein the passivating agent is of the formula (10) or (11);

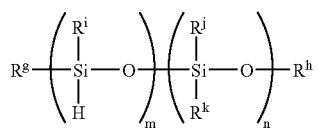
(10)

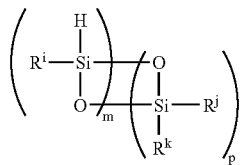
(11)

wherein m is greater than or equal to 1; the sum of m and n is equal to about 10,000: m+p is 3 to about 1000; $R^g$ and $R^i$ are each independently hydrogen, alkyl, aryl, alkylaryl, alkoxy, aryloxy, haloalkyl, haloaryl, and haloalkylaryl; $R^j$ and $R^k$ are each independently alkyl, aryl, alkylaryl, alkoxy, aryloxy, haloalkyl, haloaryl, and haloalkylaryl; and $R^h$ is trialkylsilyl, arylalkylsilyl, triarylsilyl, hydrogen, alkyl, aryl, alkylaryl, haloalkyl or haloalkylaryl;

wherein the passivating agent containing a silicon hydride functionality is present at 0.001 to about 1.0 wt. % of the polycarbonate composition;

and wherein the polycarbonate composition has a haze of less than about 20%, a total transmittance of greater than about 70%, a coefficient of thermal expansion of about 20 to about 70 um/m/° C. measured over a temperature range of 20° C. to 70° C., and a melt viscosity of about 0.5 to about 30.0 cm³/10 min measured according to ASTM D1238 at 300° C.

12. The polycarbonate composition of claim 11, wherein the passivating agent containing a silicon hydride functionality is of the formula (10) or (11):

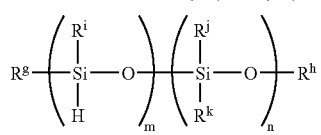
(10)

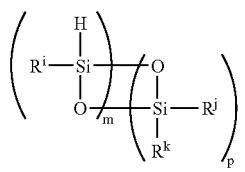
(11)

where m + n = 3–100 and m + p = 3–50.

13. The polycarbonate composition of claim 11, having a molecular weight decrease, alter thermal processing at 300° C. for 18 minutes, of less than about 30 percent of the initial weight average molecular weight of the polycarbonate.

14. The polycarbonate composition of claim 11, having a melt volume ratio of about 1.0 to about 20.0 cm³/10 min, measured at 300° C. in accordance with ASTM D1238.

15. The polycarbonate composition of claim 11, having a heat deflection temperature of about 120 to about 170° C. measured at 0.45 MPa at 23° C. using 3.2 mm bars according to ASTM D 648.

16. The polycarbonate composition of claim 11 having a Notched Izod Impact of about 50 to about 200 Joules per meter (J/m), measured at 23° C. using 3.2 mm bars according to ASTM D256.

17. The polycarbonate composition of claim 11 having a flexural modulus of about 2,500 to about 10,000 MPa measured on a 3.2 mm bar at 23° C. according to ASTM D790.

18. A film comprising in admixture:

a thermoplastic resin component comprising a polycarbonate; and a glass having a refractive index within 0.04 of the thermoplastic resin component, wherein the glass contains greater than about 10 wt. % zirconia;

wherein the glass is essentially free of compounds selected from the group consisting of aluminum oxides, boron oxides, boric acids and a combination comprising at least one of the foregoing;

wherein the glass has been passivated with a passivating agent containing a silicon hydride functionality, wherein the passivating agent is of the formula (10) or (11);

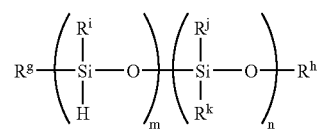
(10)

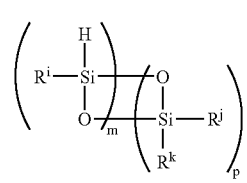
(11)

wherein m is greater than or equal to 1; the sum of m and n is equal to 1 to about 10,000; m+p is 3 to about 1000; $R^g$ and $R^i$ are each independently hydrogen, alkyl, aryl, alkylaryl, alkoxy, aryloxy, haloalkyl, haloaryl, and haloalkylaryl; $R^j$ and $R^k$ are each independently alkyl, aryl, alkylaryl, alkoxy, aryloxy, haloalkyl, haloaryl, and haloalkylaryl; and $R^h$ is trialkylsilyl, arylalkylsilyl, triarylsilyl, hydrogen, alkyl, aryl, alkylaryl, haloalkyl, haloaryl or haloalkylaryl;

wherein the passivating agent containing a silicon hydride functionality is present at 0.001 to about 1.0 wt. % of the polycarbonate composition;

wherein the film has a thickness of about 0.01 to about 3.0 mm; and wherein the film composition has a haze of less than about 20%, a total transmittance of greater than about 70%, and a coefficient of thermal expansion of about 20 to about 70 um/m/° C. measured over a temperature range of 20 to 70° C.

19. The film of claim 1, wherein the polycarbonate and glass admixture has a molecular weight decrease, after thermal processing at 300° C. for 18 minutes, of less than about 30 percent of to initial weight average molecular weight of the polycarbonate.

20. The film of claim 1, wherein the polycarbonate and glass admixture has a melt volume ratio of about 0.5 to about 30.0 cm³/10 min, measured at 300° C. in accordance with ASTM D1238.

* * * * *